UNITED STATES PATENT OFFICE.

JAMES HENDERSON, OF BELLEFONTE, PENNSYLVANIA.

PROCESS OF MANUFACTURING STEEL.

SPECIFICATION forming part of Letters Patent No. 350,587, dated October 12, 1886.

Application filed July 17, 1885. Serial No. 171,878. (No specimens.)

*To all whom it may concern:*

Be it known that I, JAMES HENDERSON, of Bellefonte, Centre county, Pennsylvania, (formerly of the city, county, and State of New York,) have invented a new and useful Improvement in Processes of Manufacturing Steel, of which the following is such a full, clear, and exact specification as will enable others skilled in the art to understand and practice the same.

The object of this invention is the more economical production of iron and steel which is practically free of phosphorus; and it consists of a continuous process of dephosphorization and decarbonizing the crude iron, and desiliconizing it in case it contains silicon, and also removing the red-short quality without transferring it from one furnace to another or remelting it between the two operations. According to this process the molten crude iron is first treated with a slag of oxide of iron until decarbonization commences, or thereabout. Then the slag, which has absorbed the phosphorus and silicon, if it be present, is withdrawn from the molten iron, and, finally, the dephosphorized and desiliconized (if the crude iron contained silicon) molten iron is decarbonized by treatment with oxidizing reagents, and any red-short or porous quality is removed by the addition of manganese.

In carrying out this invention I prefer to use a gas-furnace supplied by a gas-producer, as shown in Letters Patent granted me, No. 282,315, dated July 31, 1883.

The preferred mode of operating is to line the bottom and sides of the hearth of the furnace with magnesia brick, and upon this to charge finely-ground dolomite mixed with one to five per cent. of fluor-spar, which compound, when subjected to the heat of the furnace, becomes hardened and compact; or ten per cent. of ground fire-brick may be used instead of fluor-spar, to give the binding property to the dolomite; or fritted lime, finely ground, may be used instead of dolomite, with the same proportion of fluor-spar as before mentioned, either of which compounds forms a durable and useful lining for the purpose of practicing this invention. After the lining has been properly set by the heat of the furnace the latter is heated to the temperature usually employed when charging metal into an open-hearth steel-furnace, and then melted crude iron is charged into the furnace from a melting or smelting furnace, and iron ore in small lumps is added in the proportions of twelve to twenty-four per cent. of the weight of the crude iron, depending upon the proportion of phosphorus in the iron, twelve per cent. and twenty-four per cent. being sufficient when the phosphrus does not exceed 0.6 per cent., and twenty-four per cent. being sufficient when the crude iron contains 2.5 per cent. of phosphorus. After the melted metal is charged the temperature of the furnace is reduced to about that of a boiling puddling-furnace, and the iron ore forms a slag which floats upon the surface of the metal and absorbs its phosphorus and silicon. The action of the slag upon the metal is kept up until carbonic oxide forms, which is known by the characteristic blue flame issuing from the slags. At this period the upper tap-hole in the furnace-hearth is opened and the slag is withdrawn from the metal; or the hearth may be lowered to the track and tipped by raising it at the side opposite the tap-hole, and after the slag is removed the hearth is raised to its former position in the furnace. After the slag is removed the dephosphorized metal in the hearth is decarbonized into steel or homogeneous malleable iron. This is preferably effected by raising the heat of the furnace to about the melting-point of steel, and by use of iron ore as an oxidizing agent. The iron ore should be an oxide as free as practicable from silica and phosphorus, and it may be used in the proportion of from four hundred-weight to seven hundred-weight for each ton of iron under treatment. Manganese in the form of ferro-manganese or spiegeleisen must be added to the melted iron at the required stage of decarbonization to give the required quality of metal. When the iron becomes decarbonized to the required extent, it is tapped from the furnace and run into molds.

I do not wish to be understood as limiting myself to any special form of gas-furnace, as the Siemens regenerative furnace or Pernot furnace, when lined with magnesian brick, may be employed and good results be obtained, or other furnaces in which open-hearth steel can be made may be used.

I am aware that iron has been dephosphorized by means of oxide of iron or oxide of iron and silicon in furnaces with ore-lined hearths; but in such cases after the metal has been purified and the slag has been tapped off the metal has been run from the hearth and transferred to a furnace having a silicious or other suitable refractory hearth, in order to decarbonize it. So, also, iron has been treated on lime-hearths, with lime or lime and oxide of iron and decarbonized in the presence of the slag produced thereby; but in this case the iron during decarbonization reabsorbs phosphorus from the phosphoric slag, and the reabsorbed phosphorus is not eliminated until the decarbonization of the iron is effected; hence the metal in the condition in which it exists during decarbonization contains phosphorus, and is unfit for the production of steel by the process of arresting the decarbonization at the required stage to leave the required quantity of carbon in it for such production, whereas according to this process the phosphorus is removed from the molten iron before decarbonization has taken place, and consequently the carboniferous iron can be readily converted into good steel by stopping the decarbonization at the stage required to leave a sufficient quantity of carbon in the metal for that purpose. The gain incident to the latter system of making steel directly effects a large saving in the use of fuel, labor, and expenses. The whole of the slag also produced by the referred-to previous process of decarbonization in the presence of phosphoric slag is so much deteriorated by phosphorus as to be unfit for further use, whereas in the process hereinbefore described the phosphoric slag is withdrawn from the iron before the latter is decarbonized, so that the metal cannot reabsorb phosphorus from the slag, and the slag which is formed during decarbonization is practically free of phosphorus, and is as valuable for resmelting as pure iron ore, or it may be used for the dephosphorization of crude iron in place of the slags formed from the iron ore. By my process, also, the operation of converting into steel or homogeneous iron is accelerated by enabling the highest temperature of the furnace to be used during decarbonization, as there are no phosphoric slags to yield phosphorus to the metal. By my process about eighty per cent. of the phosphorus contained in the crude iron can be removed, and the resulting iron is sufficiently free of phosphorus for most purposes. If, however, it is deemed expedient to remove still more of the phosphorus, fluor-spar may be added to the iron during decarbonization, and preferably during the first stage thereof, the fluor-spar being thrown into the furnace upon the molten iron in lumps of from a cubic inch to three cubic inches area, or lumps of iron ore or lumps of iron ore and fluor-spar, or fluor-spar and oxidizing reagents may be ground and formed into small lumps or brick, which are thrown into the furnace. The quantity of fluor-spar which is thus used should be in the proportion of about four parts, by weight, for each part of phosphorus remaining in the iron to be decarbonized. The use of fluor-spar also removes sulphur from the metal, which result is not obtainable by use of oxide of iron or lime, or of both. Besides, it is more economical to retain the metal in the furnace, (until the required decarbonization is effected,) instead of effecting the dephosphorization by two or more operations, and then removing the metal and decarbonizing it in another furnace. By this means the phosphorus that is not removed in the first stage of the process before the decarbonization of the metal is separated from it almost wholly in the condition of gas or vapor, and consequently the slag contains so little phosphorus that it does not combine with the iron when ferro-manganese or cast-iron is added, and therefore the slag which is formed during decarbonization need not be removed prior to such addition. My process of dephosphorizing before decarbonizing also is more economical than a process which has been described for making steel by dephosphorizing after the desiliconization and decarbonization of the metal and then pouring the phosphoric slags from the furnace, or the compound process of, first, decarbonizing; second, removing the slag produced in that operation; third, dephosphorizing by the use of oxide of iron; fourth, removing the slag of dephosphorization, and, fifth, recarbonizing the iron.

In a previous patent granted to me September 4, 1883, No. 284,552, I have described the dephosphorization of silicious phosphoric irons by first desiliconizing with air in the Bessemer process and pouring the silicious slags from the converter or furnace and afterward treating the metal with fluor-spar and lime or oxide of iron with blasts of air to remove the phosphorus, which does not give as economical results as my present invention, as in that process there is considerable waste of metal from oxidation by the air-blast, while by my present process there is a large gain of metal from the oxide of iron employed.

It has been stated that the manganese is added to the molten metal in the furnace. This is the preferred application, although it is evident from what is well known of the application of manganese for the purpose above described that the manganese may be added to the molten metal after it has been tapped from the furnace into the ladle and substantially the same result be obtained.

What I claim is—

The process of manufacturing steel or homogeneous malleable iron from phosphoric cast-iron, consisting of the continuous process of dephosphorizing and decarbonizing crude iron and removing the red-short quality, substantially as before described, by first treating the molten crude iron with oxide of iron to remove the phosphorus; second, removing the slag containing the phosphorus as soon as decarbonization commences, and, third, decarbonizing the dephosphorized iron by means of an oxidizing reagent and also adding manganese to the metal, the entire process of dephosphorizing and decarbonizing being effected without removing the iron from the furnace.

JAMES HENDERSON.

Witnesses:
E. M. BLANCHARD,
GEO. L. CHASE.